(12) United States Patent
Ho et al.

(10) Patent No.: US 8,250,459 B2
(45) Date of Patent: *Aug. 21, 2012

(54) SYSTEM AND METHOD FOR PROVIDING ONLINE DATA MANAGEMENT SERVICES

(75) Inventors: Ronald Ho, Fremont, CA (US); Fuzzy Khosrowshahi, Pleasantville, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/101,312

(22) Filed: May 5, 2011

(65) Prior Publication Data

US 2012/0151317 A1 Jun. 14, 2012

Related U.S. Application Data

(60) Provisional application No. 61/422,372, filed on Dec. 13, 2010.

(51) Int. Cl.
*G06F 17/00* (2006.01)
(52) U.S. Cl. ............................................. 715/212
(58) Field of Classification Search .................. 715/212, 715/213, 218
See application file for complete search history.

(56) References Cited

U.S. PATENT DOCUMENTS

| | | | | |
|---|---|---|---|---|
| 7,516,114 B2 * | 4/2009 | Dieberger et al. | | 1/1 |
| 7,587,666 B2 * | 9/2009 | Delvat et al. | | 715/227 |
| 7,779,346 B2 * | 8/2010 | Buczek | | 715/227 |
| 7,814,407 B1 * | 10/2010 | Danner et al. | | 715/213 |
| 2002/0129054 A1 * | 9/2002 | Ferguson et al. | | 707/503 |
| 2005/0039123 A1 * | 2/2005 | Kuchinsky et al. | | 715/526 |
| 2005/0216504 A1 * | 9/2005 | Delvat et al. | | 707/103 R |
| 2008/0082938 A1 * | 4/2008 | Buczek | | 715/784 |
| 2009/0187815 A1 * | 7/2009 | Becerra et al. | | 715/212 |
| 2009/0313537 A1 * | 12/2009 | Fu et al. | | 715/212 |
| 2010/0083082 A1 * | 4/2010 | Lehrian et al. | | 715/212 |
| 2010/0313110 A1 * | 12/2010 | Claridge et al. | | 715/212 |
| 2011/0055682 A1 * | 3/2011 | Friedrich et al. | | 715/227 |
| 2011/0074699 A1 | 3/2011 | Marr et al. | | |
| 2011/0252299 A1 * | 10/2011 | Lloyd et al. | | 715/212 |
| 2011/0276867 A1 * | 11/2011 | Machalek | | 715/212 |

OTHER PUBLICATIONS

Galbreath, et al., Sharpen Spreadsheet Skills, Journal of Accountancy, vol. 186, 1998, pp. 1-3.
Xu, et al., Using Spreadsheet Software as a Platform for Power System Analysis, IEEE Computer Applications in Power, Jan. 1999, pp. 41-45.

* cited by examiner

*Primary Examiner* — Cong-Lac Huynh
(74) *Attorney, Agent, or Firm* — Wolff & Samson, PC

(57) ABSTRACT

First, second, and third sets of spreadsheet cells are defined in a display, the first and second sets being separated by a first boundary having a selected orientation, the second and third sets being separated by a second boundary having the selected orientation. A selected scrolling function is disabled within selected sets among the first, second and third sets of cells in accordance with an alternating pattern.

15 Claims, 9 Drawing Sheets

510 —

Define First, Second and Third Sets of Spreadsheet Cells in a Display, the First and Second Sets Being Separated by a First Boundary and Having a Selected Orientation, the Second and Third Sets Being Separated by a Second Boundary and Having the Same Orientation

520 —

Disabling a Selected Scrolling Function within the Selected Sections Among the First, Second and Third Sets of Cells in Accordance with an Alternating Pattern

FIG. 5

SYSTEM AND METHOD FOR PROVIDING ONLINE DATA MANAGEMENT SERVICES

This application claims the benefit of U.S. Provisional Patent Application No. 61/422,372, filed Dec. 13, 2010, which is hereby incorporated by reference herein.

TECHNICAL FIELD

This specification relates generally to systems and methods for providing online services, and more particularly to systems and methods for providing online data management services.

BACKGROUND

Online spreadsheet management applications allow users to create and manipulate spreadsheet data via a network, and maintain the data at a remote location. Current spreadsheet management applications offer many common spreadsheet functions, including formatting, graphing, filtering, etc. Many existing applications also allow a user to "freeze" a selected section of spreadsheet cells on a display. For example, a user may define a single vertically-oriented boundary on the display and disable the horizontal scrolling function on one side of the vertical boundary, or define a single horizontally-oriented boundary and disable the vertical scrolling function on one side of the horizontal boundary. By defining one horizontal boundary and one vertical boundary, a user may create four sections on the display and designate a "frozen" section in which all scrolling is disabled.

SUMMARY

In accordance with an embodiment, a method for displaying data is provided. First, second, and third sets of spreadsheet cells are defined in a display, the first and second sets being separated by a first boundary having a selected orientation, the second and third sets being separated by a second boundary having the same orientation. A selected scrolling function is disabled within selected sets among the first, second and third sets of cells in accordance with an alternating pattern.

The alternating pattern may be determined based on a selection received from a user. For example, the selected scrolling function may be disabled only within the first and third sets of cells, if the user selects the first set or the third set. The selected scrolling function may be disabled only within the second sets of cells, if the user selects the second set. The selected scrolling function may be selected from a vertical scrolling function and a horizontal scrolling function.

In one embodiment, a first selection of one of the first, second, and third sets of spreadsheet cells and a request for additional options are received from a user. In response, a menu comprising a disable scrolling option is displayed. A second selection of the disable scrolling option is received from the user, and a scrolling function is disabled within selected sets of spreadsheet cells, in response to the second selection.

The first, second and third sets of spreadsheet cells may be determined based on input received from a user. For example, a first position of the first boundary may be adjusted in response to first signals received from the user, and a second position of the second boundary may be adjusted in response to second signals received from the user. The first and second boundaries may have an orientation selected from a vertical orientation and a horizontal orientation.

In one embodiment, a third boundary having a second orientation perpendicular to the selected orientation is defined on the display, wherein the third boundary defines fourth and fifth sets of cells. A second scrolling function different from the scrolling function is disabled within at least one of the fourth and fifth sets of cells.

A first request to display the first and second boundaries in the selected orientation may be transmitted to a browser application operating on a user device. A second request to scroll information in the first, second and third sets of cells in accordance with the alternating pattern may also be transmitted to the browser application.

In accordance with another embodiment, an apparatus for displaying data is provided. The apparatus comprises means for defining first, second, and third sets of spreadsheet cells in a display, the first and second sets being separated by a first boundary having a selected orientation, the second and third sets being separated by a second boundary having the selected orientation. The apparatus also comprises means for disabling a selected scrolling function within selected sets among the first, second and third sets of cells in accordance with an alternating pattern.

These and other advantages of the present disclosure will be apparent to those of ordinary skill in the art by reference to the following Detailed Description and the accompanying drawings.

BRIEF DESCRIPTION OF THE DRAWINGS

FIG. 5 is a flowchart of a method for providing spreadsheet data management services in accordance with an embodiment;

DETAILED DESCRIPTION

Figure 1:
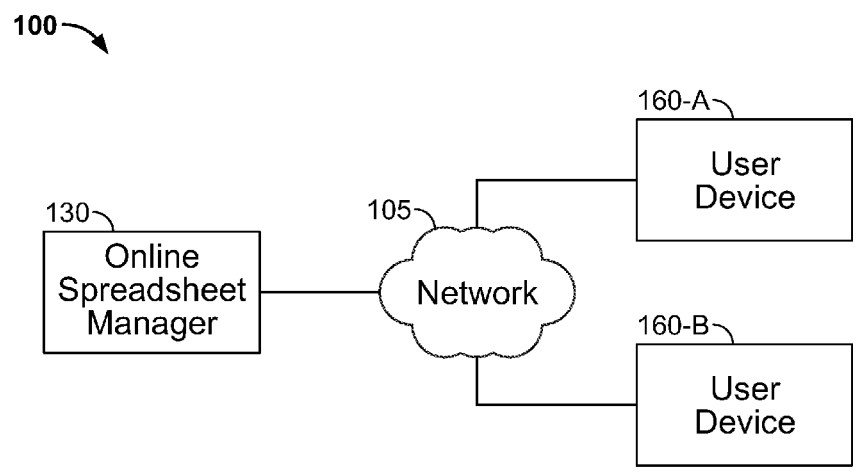
FIG. 1 shows a communication system that may be used to provide online services in accordance with an embodiment.

FIG. 1 shows a communication system 100 that may be used to provide online services, in accordance with an embodiment. Communication system 100 comprises a network 105, an online spreadsheet manager 130, and user devices 160-A, 160-B, etc. For convenience, the term "user device 160" is used herein to refer to any one of user devices 160-A, 160-B, etc. Accordingly, any discussion herein referring to "user device 160" is equally applicable to each of user devices 160-A, 160-B, etc. Communication system 100 may comprise more or fewer than two user devices.

In the exemplary embodiment of FIG. 1, network 105 is the Internet. In other embodiments, network 105 may comprise one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may comprise a combination of different types of networks.

Online spreadsheet manager 130 provides spreadsheet data management services to users via network 105, enabling users to create, display, analyze, filter, and edit spreadsheet data sets remotely. Online spreadsheet manager 130 may be accessible via a World Wide Web page that may be viewed using a conventional Web browser, for example. A user may be required to log into a respective user account to access his or her spreadsheet data. Online spreadsheet manager 130 may offer common spreadsheet management features such as formatting, graphing, filtering, etc.

User device 160 may be any device that enables a user to communicate via network 105. User device 160 may be connected to network 105 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 2:
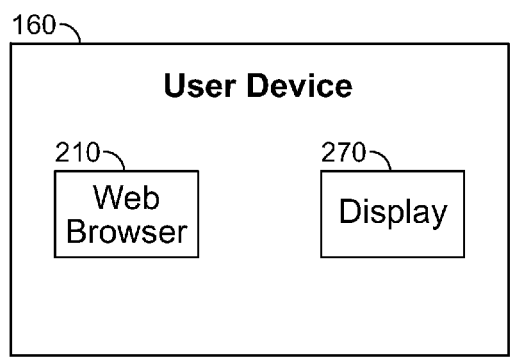
FIG. 2 shows functional components of an exemplary user device.

FIG. 2 shows functional components of an exemplary user device 160. User device 160 comprises a web browser 210 and a display 270. Web browser 210 may be a conventional web browser used to access World Wide Web sites via the Internet, for example. Display 270 displays spreadsheet data, documents, Web pages, and other information to a user. For example, a spreadsheet data set that a user creates or edits may be displayed on display 270.

Figure 3:
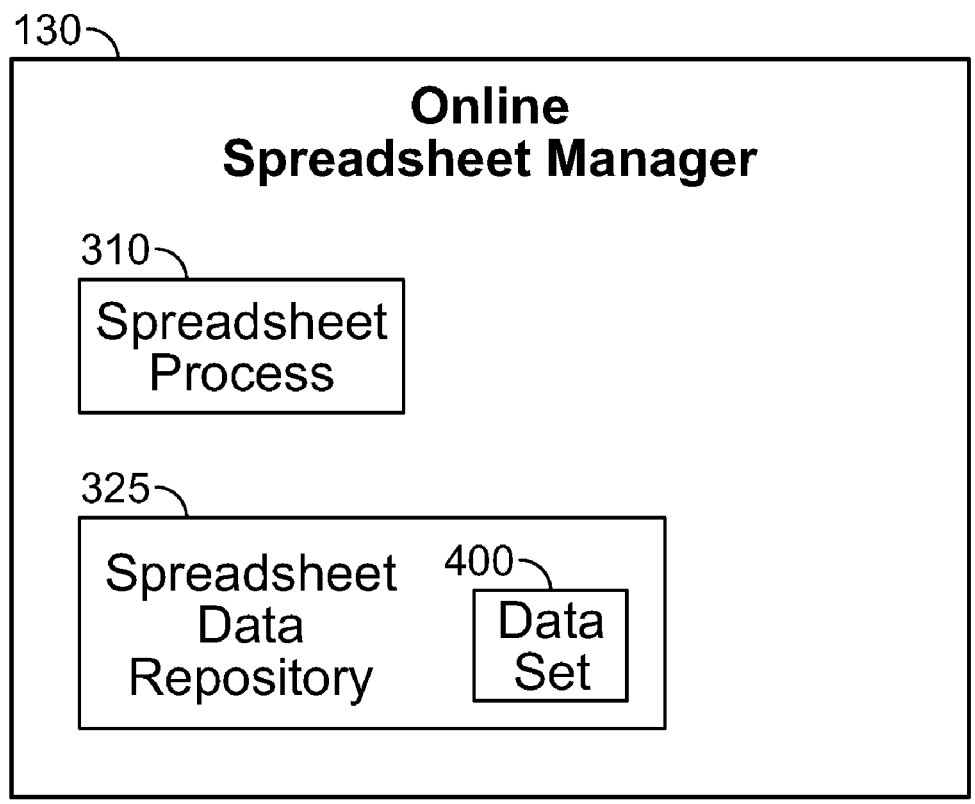
FIG. 3 shows functional components of an online spreadsheet manager in accordance with an embodiment.

FIG. 3 shows functional components of online spreadsheet manager 130 in accordance with an embodiment. Online spreadsheet manager 130 comprises a spreadsheet process 310 and a spreadsheet data repository 325. Spreadsheet process 310 manages spreadsheet data and performs operations requested by users, such as mathematical operations, graphing, filtering, etc. Spreadsheet data sets created by users are stored in spreadsheet data repository 325. A spreadsheet data set created by a user may be stored in association with his or her user account, for example. Multiple versions of a user's spreadsheet data set may be stored in spreadsheet data repository 325.

In accordance with the embodiment of FIG. 1, a user may access online spreadsheet manager 130 and create and/or edit a spreadsheet data set. For example, a user may employ browser 210 to access a World Wide Web site maintained by online spreadsheet manager 130. In a well-known manner, the user may be required to log into a user account to access his or her documents. The user may be required to authenticate his or her identity, e.g., by entering a user name and password, before accessing his or her user account and spreadsheet data associated with the account.

Figure 4:
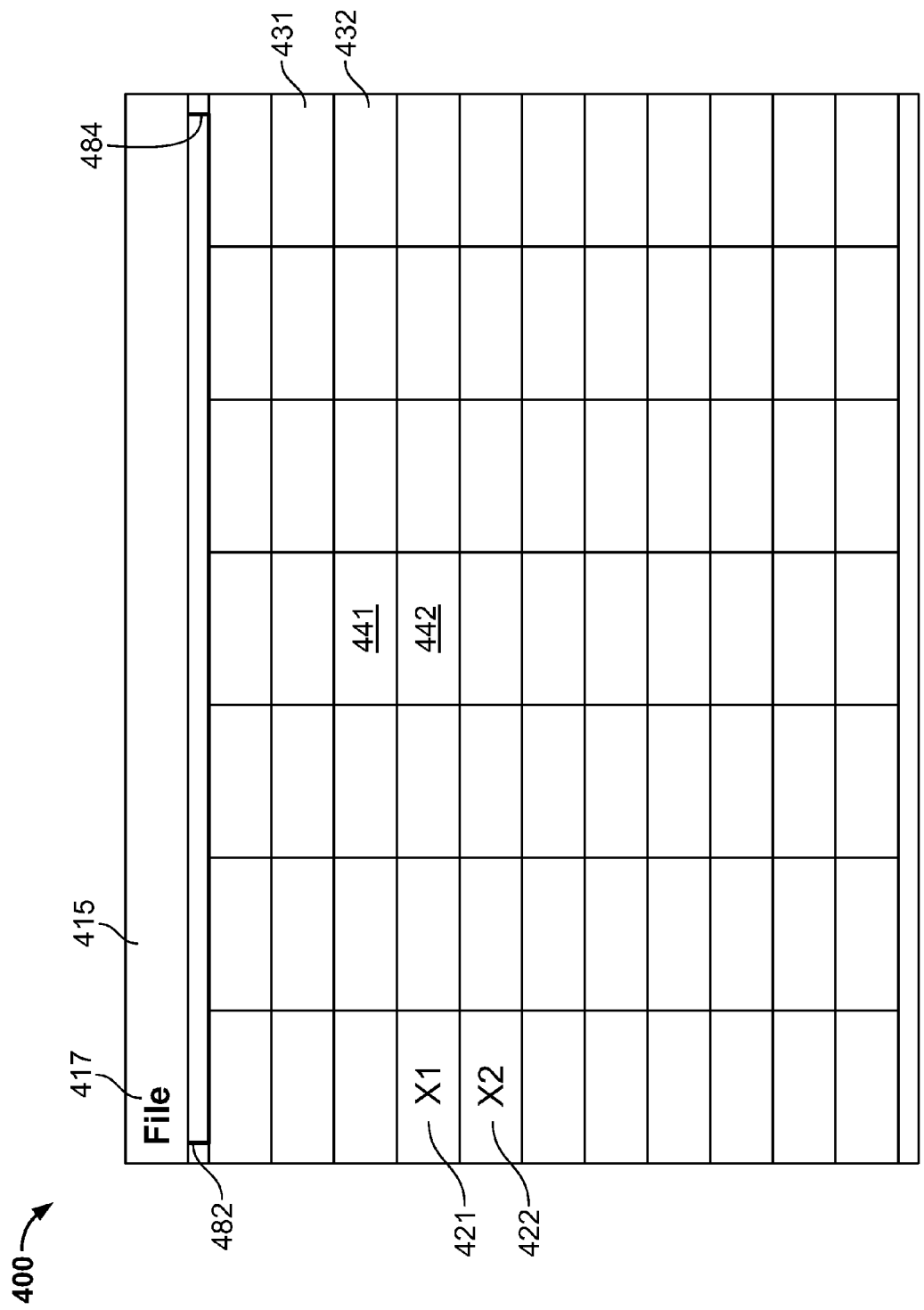
FIG. 4 shows a display of spreadsheet data in accordance with an embodiment.

Suppose, for example, that a user employs browser 210 to access online spreadsheet manager 130 and creates a new spreadsheet data set, such as spreadsheet data set 400 illustrated in FIG. 4. Online spreadsheet manager 130 stores spreadsheet data set 400 in spreadsheet data repository 325, as shown in FIG. 3.

To enable the user to view and edit spreadsheet data set 400, online spreadsheet manager 130 transmits data causing user device 160 to display a representation of all or a portion of the spreadsheet data set on a Web page, in a well-known manner. For example, online spreadsheet manager 130 may transmit to browser 210 a request, in the form of HyperText Markup Language (HTML), adapted to cause browser 210 to display a representation of spreadsheet data set 400. In response, browser 210 displays a representation of all or a portion of spreadsheet data set 400. In a conventional manner, browser 210 displays spreadsheet data set 400 as a plurality of cells, such as cells 421, 422, 431, 432, 441, and 442. Browser 210 also displays a toolbar 415 which may display various available options and/or functions available to the user, such as a file function 417. When the user edits and saves spreadsheet data set 400, the edited data set is stored in spreadsheet data repository 325.

In accordance with an embodiment, a user viewing spreadsheet data set 400 may define multiple sets of spreadsheet cells on display 270 and "freeze" selected sets of cells (i.e., disable a scrolling function within the selected sets). For example, browser 210 may display one or more indicators on display 270 that enable a user to define a boundary between sets of spreadsheet cells on display 270. In the embodiment of FIG. 4, the user may move indicator 482 to the right or to the left to a desired position, and then double-click on the indicator to define a boundary between two sets of cells. The user may manipulate indicator 484 in a similar manner to define a second boundary. Other indicators may be displayed and manipulated by the user to define other boundaries.

Disabling horizontal and vertical scrolling functions within a selected set of cells in a display of spreadsheet data is known. However, existing spreadsheet management applications do not enable a user to define more than two horizontally oriented sets of cells or more than two vertically oriented sets of cells within a display of spreadsheet data.

In accordance with an embodiment, a user may define more than two horizontally oriented sets of spreadsheet cells and/or more than two vertically oriented sets of spreadsheet cells within a display of spreadsheet data, and freeze selected sets among the defined sets of cells. A particular scrolling function (horizontal scrolling or vertical scrolling) may be disabled in non-adjacent sets of cells. In the exemplary embodiments described herein, a particular scrolling function may be disabled within non-adjacent vertically oriented sets of cells, or within non-adjacent horizontally oriented sets of cells, in an alternating pattern.

Figure 6:
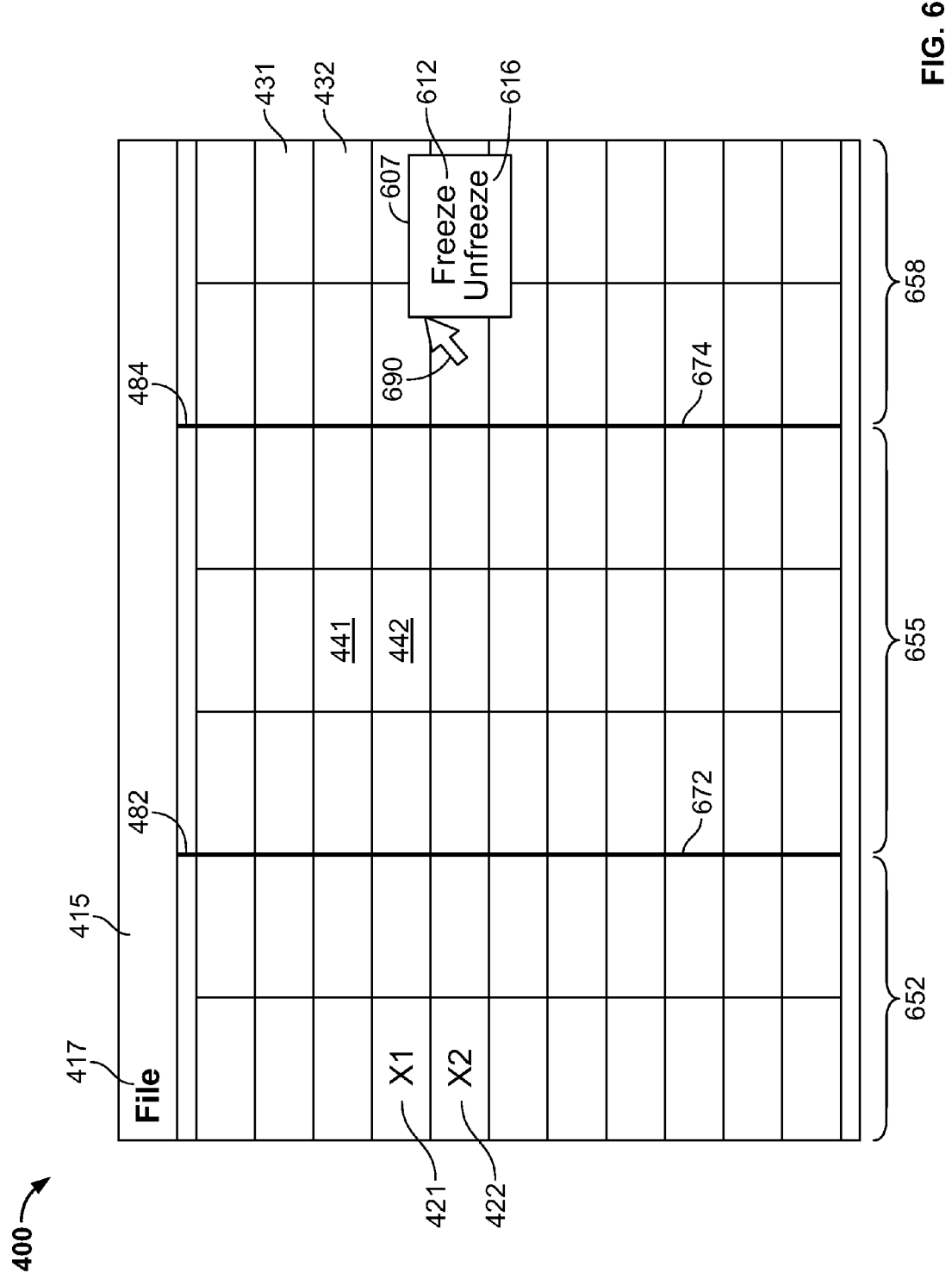
FIG. 6 shows a display of spreadsheet data in accordance with an embodiment.

FIG. 5 is a flowchart of a method for displaying spreadsheet data in accordance with an embodiment. At step 510, first, second, and third sets of spreadsheet cells are defined within a display, the first and second sets being separated by a first boundary having a selected orientation, the second and third sets being separated by a second boundary having the same orientation. Referring now to FIG. 6, supposing that the user positions indicator 482 in a desired position and double-clicks on the indicator, browser 210 transmits the user's commands to online spreadsheet manager 130. In response, online spreadsheet manager 130 transmits a request, or other data, adapted to cause browser 210 to display a first boundary 672 on display 270. First boundary 672 defines a first set 652 of spreadsheet cells and a second set 655 of spreadsheet cells. Supposing further that the user positions indicator 484 in a desired position and double-clicks on the indicator, a second boundary 674 is defined on display 270. Second boundary 674 separates second set 655 of spreadsheet cells from a third set 658 of spreadsheet cells. Information defining the positions of boundaries 672 and 674 may be stored in spreadsheet data repository 325, or alternatively may be stored in user device 160.

After boundaries 672 and 674 have been defined, the user may freeze one or more selected sets from among the defined sets of cells. In the exemplary embodiment of FIG. 6, the user may use a computer mouse to position a cursor 690 over a selected set of spreadsheet cells, and then right-click on the computer mouse to view a menu 607 of options. Menu 607 includes a freeze option 612 and an unfreeze option 616. In this example, the user positions cursor 690 over set 658 and selects freeze option 612. Browser 210 transmits the user's selection of set 658 and of freeze option 612 to online spreadsheet manager 130.

Referring again to FIG. 5, at step 520, a selected scrolling function is disabled within selected sets among the first, second and third sets of cells in accordance with an alternating pattern. In the present example, in response to the user's selections, online spreadsheet manager 130 disables a horizontal scrolling function in set 658. In accordance with an alternating pattern, horizontal scrolling is also disabled in set 652 (but horizontal scrolling is not disabled in set 655). Online spreadsheet manager 130 transmits data, such as a request, adapted to cause browser 210 to scroll and display a representation of the information in spreadsheet data set 400 in accordance with the user's selected options.

Subsequently when the user scrolls vertically on display 270, the cells in all three sets 652, 655, and 658 scroll upward or downward in response to the user's commands. However, when the user attempts to scroll horizontally in set 652 or in set 658, browser 210 transmits the user's command (to scroll horizontally) to online spreadsheet manager 130, which, in response, transmits a request to browser 210 to continue to display a representation of the cells in sets 652 and 658 in their current positions. As a result, the spreadsheet cells in these sets, including cells 421, 422, 431, and 432, do not scroll horizontally but remain frozen in their respective locations. If the user scrolls horizontally in set 655, browser 210 transmits the user's command (to scroll horizontally) to online spreadsheet manager 130, which, in response, transmits a request to browser 210 to scroll the cells in set 655, and the information therein, horizontally. As a result, the cells in set 655, including cells 441, and 442, respond and scroll to the right or left in response to the user's commands.

By freezing the horizontal scrolling function in sets 652 and 658, a user may ensure that one or more first columns in set 652, such as a column listing individuals' names, and one or more second columns in set 658, such as a column showing a calculated value for each individual named in the first column, remain continually displayed on display 270, while the user retains the ability to scroll horizontally through, and edit, spreadsheet cells in set 655. In this way, the user may, for example, edit information pertaining to various individuals and immediately view how such changes affect the calculated value shown in the second column (in set 658). The embodiment shown in FIG. 6 may be used for other purposes.

When the user wishes to return to a normal viewing mode with scrolling enabled in all sets of cells on display 270, the user may position cursor 690 over set 658 (or over set 652) and right-click on the computer mouse to view options menu 607. The user may then select unfreeze option 616. In response, online spreadsheet manager 130 restores the horizontal scrolling function in all sets of cells on the display.

Alternatively, the user may choose to disable horizontal scrolling in middle set 655. When the user freezes set 655, in accordance with an alternating pattern, horizontal scrolling is disabled in set 655, but is enabled in sets 652 and 658.

The methods and systems described above may be used to allow a user to define other types and combinations of boundaries and to freeze selected sets of spreadsheet cells defined by the boundaries. For example, in another embodiment shown in FIG. 7, a user may define three horizontal sets of spreadsheet cells on display 270 and freeze one or more selected sets. In this example, while viewing spreadsheet data set 400, the user positions an indicator 792 in a desired position and double-clicks on the indicator. Browser 210 transmits the user's commands to online spreadsheet manager 130, which, in response, transmits a request to browser 210 to display a first horizontally oriented boundary 772 defining a first horizontally oriented set 752 of spreadsheet cells and a second horizontally oriented set 755 of spreadsheet cells. The user also positions a second indicator 794 in a desired position and double-clicks on the second indicator, to define a second horizontally oriented boundary 774 on display 270. Second boundary 774 separates second set 755 of spreadsheet cells from a third horizontally oriented set 758 of spreadsheet cells.

Figure 7:
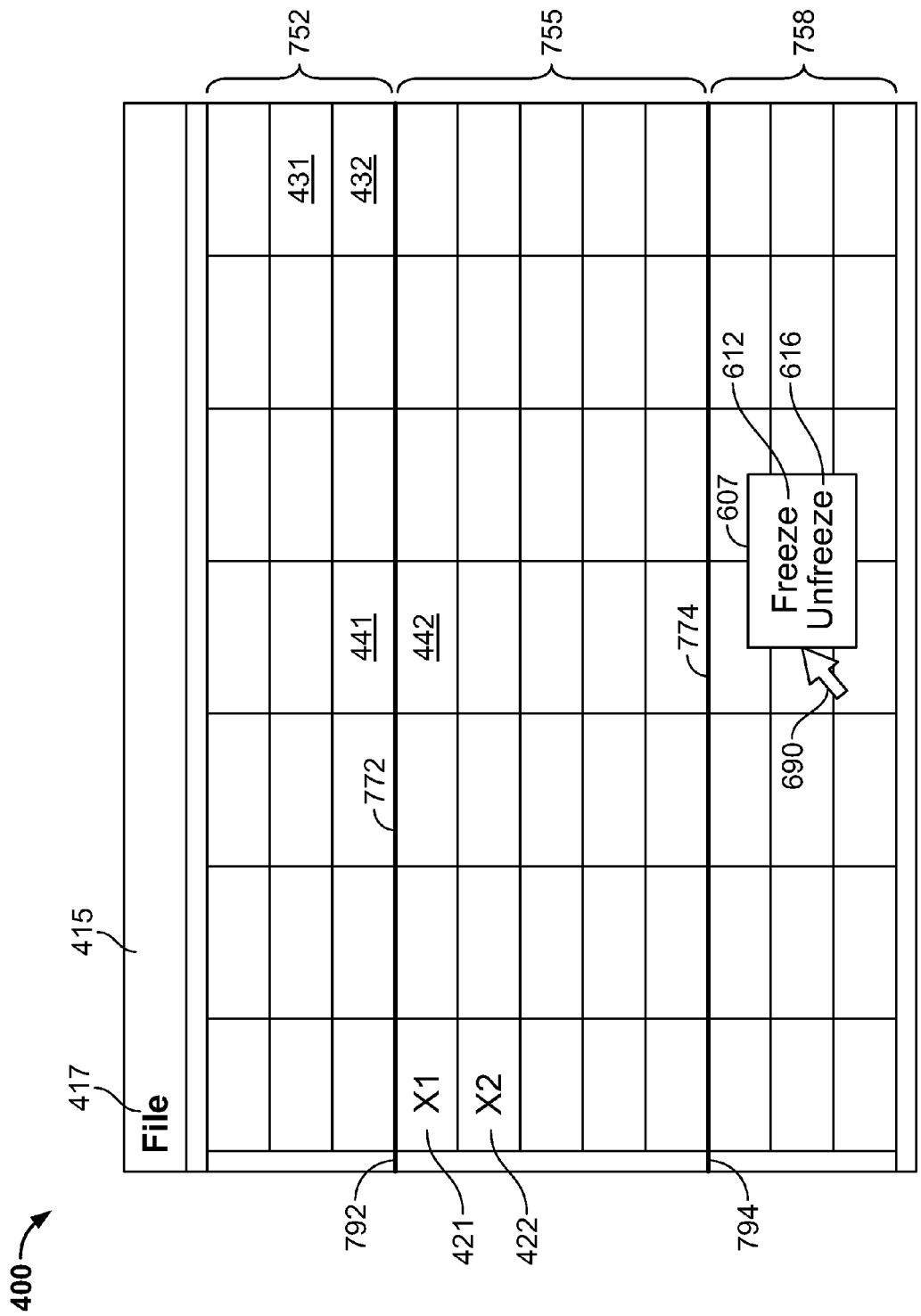
FIG. 7 shows a display of spreadsheet data in accordance with an embodiment.

Now the user may freeze one or more selected sets from among the defined sets of cells. In a manner similar to that described above, the user employs a computer mouse to position cursor 690 over a selected set of cells, right-clicks on the computer mouse to view options menu 607, and selects freeze option 612. In the illustrative embodiment, the user selects and freezes set 758. In response to the user's selection, a selected scrolling function is disabled within one or more of sets 752, 755, and 758 in accordance with an alternating pattern. In the example of FIG. 7, browser 210 transmits the user's selection to online spreadsheet manager 130, and in response, online spreadsheet manager 130 disables a vertical scrolling function in set 758. In accordance with an alternating pattern, vertical scrolling is also disabled in set 752, but is not disabled in set 755. Online spreadsheet manager 130 transmits one or more requests that browser 210 display a representation of the spreadsheet data and scroll spreadsheet data in accordance with the selected pattern.

By freezing the vertical scrolling function in sets 752 and 758, a user may ensure, for example, that one or more first rows in set 752 and one or more second rows in set 758 remain continually displayed on display 270, while retaining the ability to scroll vertically through spreadsheet cells in set 755. In this way, the user may, for example, edit selected information in spreadsheet data set 400 and readily view how such changes affect values in the frozen first and second rows (in sets 752 and 758). The embodiment shown in FIG. 7 may be used for other purposes.

When the user wishes to return to a normal viewing mode with scrolling enabled in all sets of cells on display 270, the user may position cursor 690 over set 758 (or over set 752) and right-click on the computer mouse to view options menu 607. The user may then select unfreeze option 616. In response, online spreadsheet manager 130 restores the vertical scrolling function in all sets of cells on the display.

Alternatively, the user may choose to disable vertical scrolling in middle set 755. When the user selects this option, in accordance with an alternating pattern, vertical scrolling is enabled in sets 752 and 758, and disabled in set 755 only.

Figure 8:
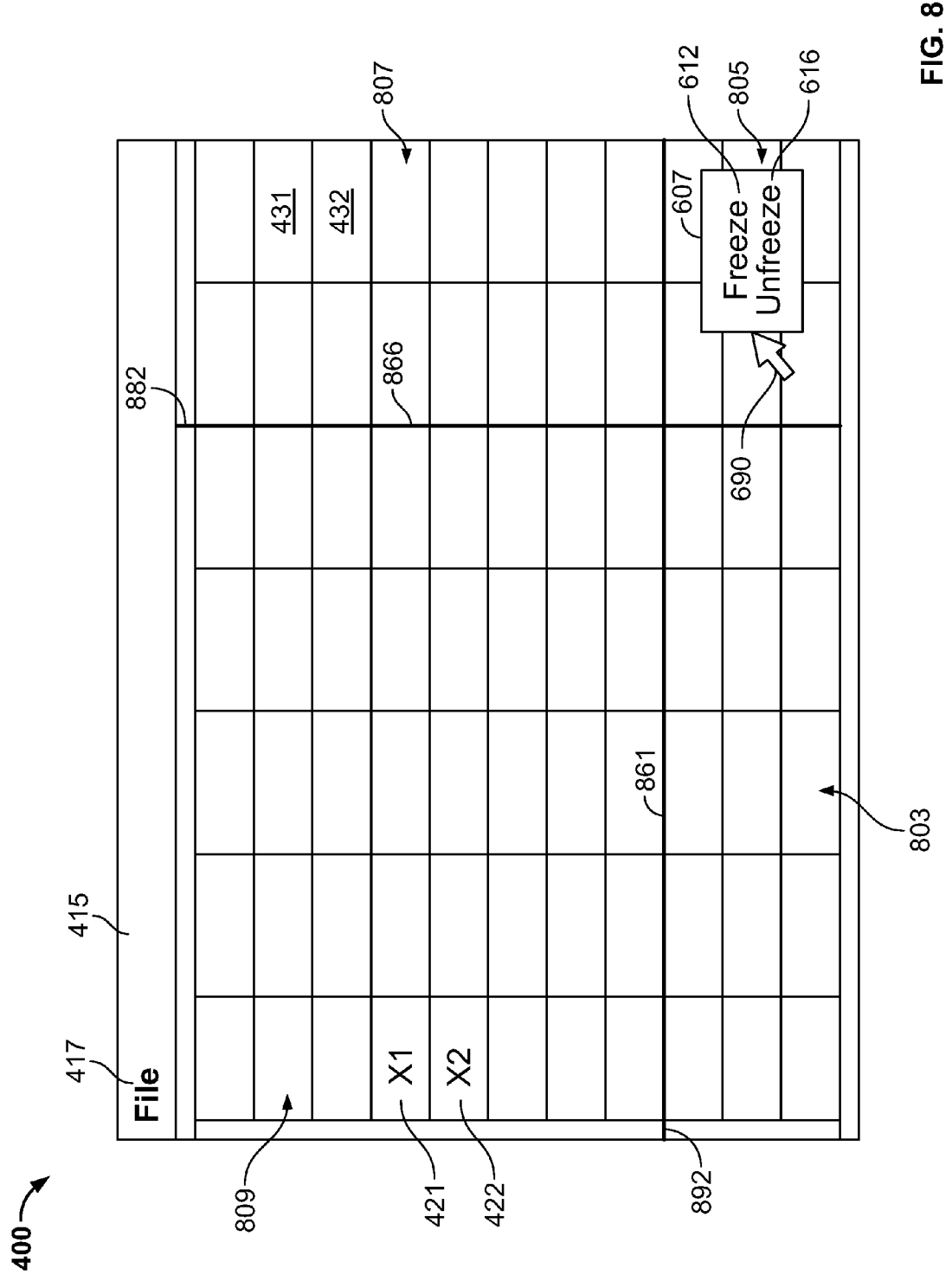
FIG. 8 shows a display of spreadsheet data in accordance with an embodiment.

In another embodiment shown in FIG. 8, a user may define two vertical sets of spreadsheet cells and two horizontal sets of spreadsheet cells on display 270, and freeze one or more selected sets. In the illustrative example, the user positions an indicator 882 in a desired position to define a vertically oriented boundary 866 on display 270, and positions a second indicator 892 in a desired position to define a horizontally oriented boundary 861 on display 270. Together, horizontal boundary 861 and vertical boundary 866 define four sets of spreadsheet cells 803, 805, 807, and 809.

Now the user may freeze selected sets from among the defined sets. In a manner similar to that described above, the user may use a computer mouse to position cursor 690 over a selected set, and right-click on the computer mouse to view options menu 607. When the user selects freeze option 612, vertical scrolling is disabled in the spreadsheet cell set selected by the user and in the other sets located on the same side of horizontal boundary 861. Horizontal scrolling is disabled in the spreadsheet cell set selected by the user and in the other set located on the same side of vertical boundary 866.

In the example of FIG. 8, the user selects spreadsheet cell set 805. In response to the user's selection, online spreadsheet manager 130 disables the horizontal scrolling function in sets 805 and 807 (to the right of vertical boundary 866) but not in sets 803 and 809 (to the left of vertical boundary 866). Similarly, online spreadsheet manager 130 disables the vertical scrolling function in sets 803 and 805 (below horizontal boundary 861) but not in sets 809 and 807 (above horizontal boundary 861). Both vertical and horizontal scrolling functions are disabled in sets 805 (the set selected by the user), causing the spreadsheet cells in set 805 to be frozen. The cells in set 809 are unfrozen and can be scrolled both vertically and horizontally.

When the user wishes to return to a normal viewing mode with scrolling enabled in all sets of cells on display 270, the user may position cursor 690 over set 805 and right-click on the computer mouse to view options menu 607. The user may then select unfreeze option 616. In response, online spreadsheet manager 130 restores the vertical and horizontal scrolling function in all sets of cells on the display.

Alternatively, the user may freeze set 803, set 807, or set 809 by positioning cursor 690 above the selected set and selecting freeze option 612, in the manner described above. When the user selects a set of spreadsheet cells in this manner and selects freeze option 612, the vertical and horizontal scrolling functions are disabled in the selected set of cells and in other sets of cells in a pattern determined in a manner similar to that described above.

Figure 9:
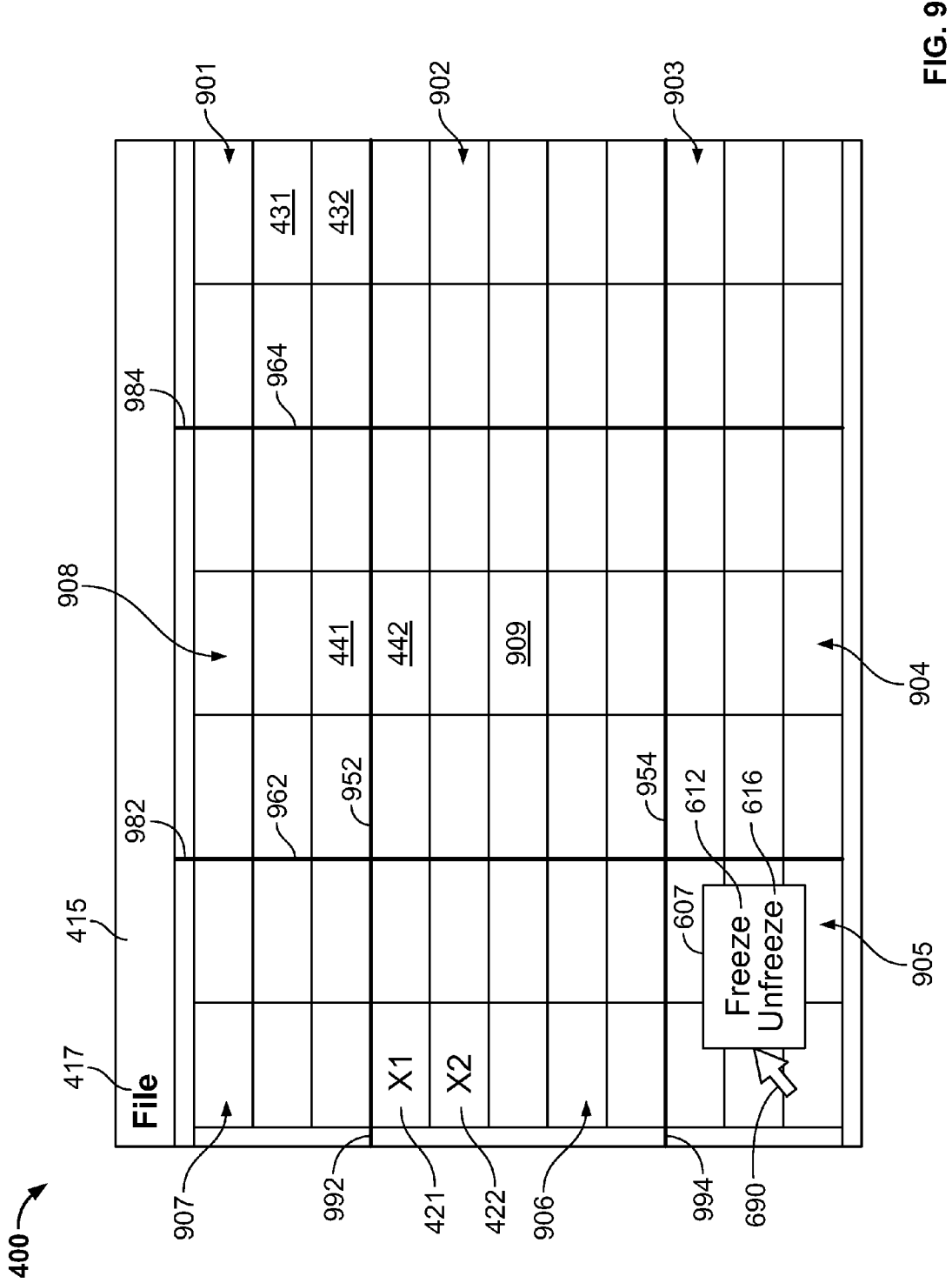
FIG. 9 shows a display of spreadsheet data in accordance with an embodiment.

In another embodiment shown in FIG. 9, a user may define three vertical sets and three horizontal sets on display 270 and freeze one or more selected sets in accordance with an alternating pattern. In this example, while viewing spreadsheet data set 400, the user positions indicators 982 and 984 in desired positions to define two vertically oriented boundaries 962 and 964 on display 270, and positions indicators 992 and 994 in desired positions to define two horizontally oriented boundaries 952 and 954 on display 270. Together, vertical boundaries 962 and 964 and horizontal boundaries 952 and 954 define nine subsets of spreadsheet cells 901-909.

The user may freeze one or more selected subsets from among defined subsets 901-909. In a manner similar to that described above, the user may use a computer mouse to position cursor 690 over a selected subset, right-click on the computer mouse to view options menu 607, and select freeze option 612. In this example, the user selects, and freezes, subset 905. In response to the user's selection, spreadsheet manager 130 disables both the vertical and the horizontal scrolling functions within the selected subset of cells (subset 905). In addition, vertical scrolling and horizontal scrolling are disabled in other subsets of cells in accordance with an alternating pattern. Horizontal scrolling is disabled to the left of vertical boundary 962 (subsets 905-907) and to the right of vertical boundary 964 (subsets 901-903), but is not disabled between vertical boundaries 962 and 964 (subsets 908, 909, and 904). Vertical scrolling is disabled below horizontal boundary 954 (subsets 903-905) and above horizontal boundary 952 (subsets 907, 908, and 901), but is not disabled between horizontal boundaries 952 and 954 (subsets 906, 909, and 902). As a result, corner subsets 901, 903, 905, and 907 are frozen, while central subset 909 is unfrozen (both vertical and horizontal scrolling are allowed in central subset 909). In subsets 908 and 904, only horizontal scrolling is allowed. In subsets 906 and 902, only vertical scrolling is allowed. In one embodiment, horizontal scrolling within subsets 908, 909, and 904 is synchronized; thus, when horizontal scrolling occurs within one of the subsets, all three of the subsets scroll horizontally together. Similarly, vertical scrolling within subsets 906, 909, and 902 is synchronized; when vertical scrolling occurs within one of the subsets, all three of the subsets scroll vertically together.

By disabling the horizontal scrolling function to the left of vertical boundary 962 and to the right of vertical boundary 964, and the vertical scrolling function above horizontal boundary 952 and below horizontal boundary 954, a user may ensure that selected spreadsheet cells within spreadsheet data set 400 remain frozen and continually in view while other portions of spreadsheet 400 may be manipulated and edited. For example, selected headers at the top of spreadsheet data set 400 may be frozen, and selected cells at the bottom of the spreadsheet containing calculated values may be frozen. The user may scroll through and edit other cells in the spreadsheet, retaining the ability to view how such changes affect the calculated values shown in the frozen cells. The embodiment shown in FIG. 9 may be used for other purposes.

When the user wishes to return to a normal viewing mode with scrolling enabled in all sets, and subsets, of cells on display 270, the user may position cursor 690 over subset 905 and right-click on the computer mouse to view options menu 690. The user may then select unfreeze option 616. In response, online spreadsheet manager 130 restores the vertical and horizontal scrolling function in all sets, and subsets, of cells on the display.

Alternatively, the user may select subset 909 and select freeze option 612 to freeze subset 909. In response to the user's selection, the vertical scrolling function is disabled between horizontal boundaries 952 and 954 (subsets 906, 909, and 902), and the horizontal scrolling function is disabled between vertical boundaries 962 and 964 (subsets 908, 909, and 904). As a result, subset 909 is frozen while corner subsets 901, 903, 905, and 907 are unfrozen.

In various embodiments, the method steps described herein, including the method steps described in FIG. 5, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 5. Certain steps of the methods described herein, including one or more of the steps of FIG. 5, may be performed by a server or by another processor in a network-based cloud-computing system. Certain steps of the methods described herein, including one or more of the steps of FIG. 5, may be performed by a client computer in a network-based cloud computing system. The steps of the methods described herein, including one or more of the steps of FIG. 5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 10:
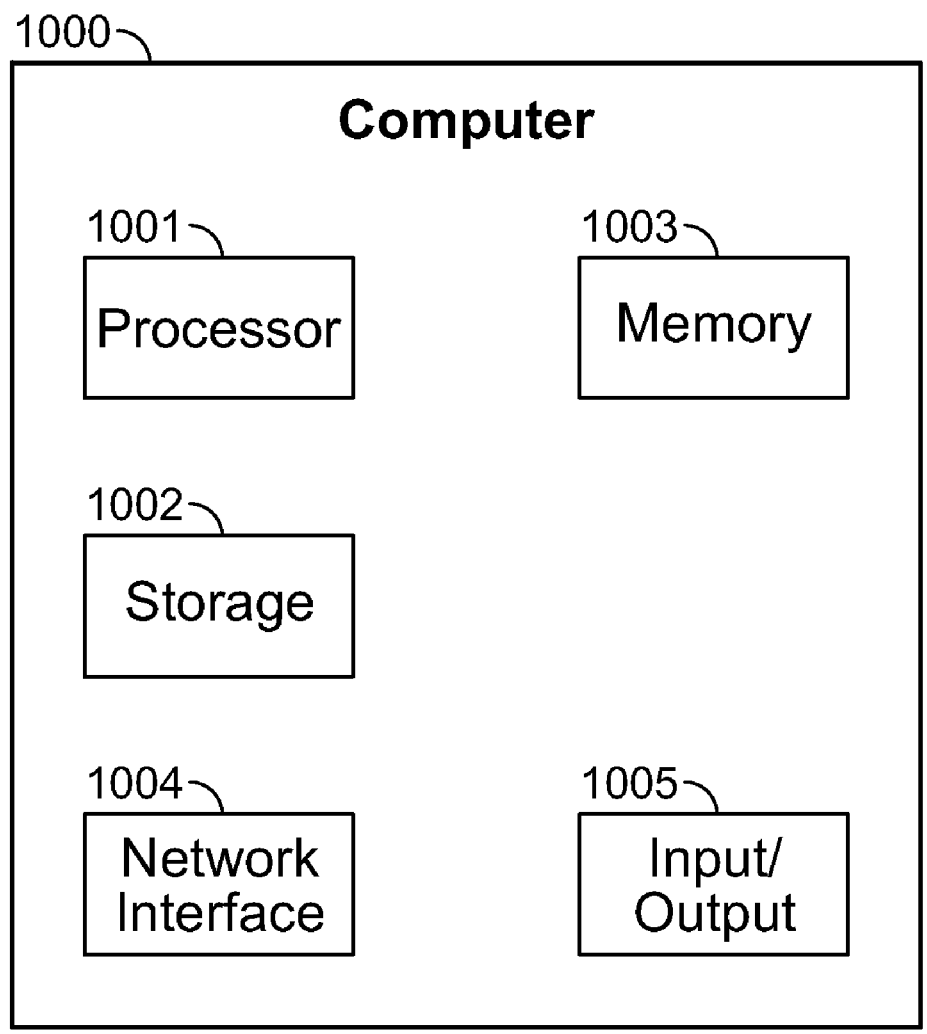
FIG. 10 shows components of an exemplary computer.

A high-level block diagram of an exemplary computer that may be used to implement systems, apparatus and methods described herein is illustrated in FIG. 10. Computer 1000 comprises a processor 1001 operatively coupled to a data storage device 1002 and a memory 1003. Processor 1001 controls the overall operation of computer 1000 by executing computer program instructions that define such operations. The computer program instructions may be stored in data storage device 1002, or other computer readable medium, and loaded into memory 1003 when execution of the computer program instructions is desired. Thus, the method steps of FIG. 5 can be defined by the computer program instructions stored in memory 1003 and/or data storage device 1002 and controlled by the processor 1001 executing the computer program instructions. For example, the computer program instructions can be implemented as computer executable code programmed by one skilled in the art to perform an algorithm defined by the method steps of FIG. 5. Accordingly, by executing the computer program instructions, the processor 1001 executes an algorithm defined by the method steps of FIG. 5. Computer 1000 also includes one or more network interfaces 1004 for communicating with other devices via a network. Computer 1000 also includes one or more input/output devices 1005 that enable user interaction with computer 1000 (e.g., display, keyboard, mouse, speakers, buttons, etc.).

Processor 1001 may include both general and special purpose microprocessors, and may be the sole processor or one of multiple processors of computer 1000. Processor 1001 may comprise one or more central processing units (CPUs), for example. Processor 1001, data storage device 1002, and/or memory 1003 may include, be supplemented by, or incorporated in, one or more application-specific integrated circuits (ASICs) and/or one or more field programmable gate arrays (FPGAs).

Data storage device 1002 and memory 1003 each comprise a tangible non-transitory computer readable storage medium. Data storage device 1002, and memory 1003, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1005 may include peripherals, such as a printer, scanner, display screen, etc. For example, input/output devices 1005 may include a display device such as a cathode ray tube (CRT) or liquid crystal display (LCD) monitor for displaying information to the user, a keyboard, and a pointing device such as a mouse or a trackball by which the user can provide input to computer 1000.

Any or all of the systems and apparatus discussed herein, including online spreadsheet manager 130, user device 160, and components thereof, including web browser 210, display 270, spreadsheet process 310, and spreadsheet data repository 325, may be implemented using a computer such as computer 1000.

One skilled in the art will recognize that an implementation of an actual computer or computer system may have other structures and may contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for displaying data, the method comprising:
defining first, second, and third sets of spreadsheet cells in a display, the first and second sets being separated by a first boundary having a selected orientation, the second and third sets being separated by a second boundary having the selected orientation;
disabling a selected scrolling function within selected sets among the first, second and third sets of cells in accordance with an alternating pattern; and
determining the alternating pattern based on a selection received from a user;
wherein the step of disabling a selected scrolling function within selected sets among the first, second and third sets of cells in accordance with an alternating pattern further comprises:

disabling the selected scrolling function only within the first and third sets of cells, if the user selects the first set or the third set; and disabling the selected scrolling function only within the second sets of cells, if the user selects the second set.

2. The method of claim 1, wherein the selected scrolling function is selected from a vertical scrolling function and a horizontal scrolling function.

3. The method of claim 1, further comprising:

receiving from the user a first selection of one of the first, second, and third sets of spreadsheet cells and a request for additional options;

displaying a menu comprising a disable scrolling option, in response to the request;

receiving from a user a second selection of the disable scrolling option; and disabling a scrolling function within selected sets of spreadsheet cells, in response to the second selection.

4. The method of claim 1, further comprising:

determining the first, second and third sets of spreadsheet cells based on input received from a user.

5. The method of claim 4, further comprising:

adjusting a first position of the first boundary in response to first signals received from the user; and adjusting a second position of the second boundary in response to second signals received from the user.

6. The method of claim 5, wherein the first and second boundaries have an orientation selected from a vertical orientation and a horizontal orientation.

7. The method of claim 6, further comprising:

defining, on the display, a third boundary having a second orientation perpendicular to the selected orientation, wherein the third boundary defines fourth and fifth sets of cells; and disabling a second scrolling function different from the scrolling function within at least one of the fourth and fifth sets of cells.

8. The method of claim 1, wherein the first, second, and third sets of spreadsheet cells display information associated with a spreadsheet data set maintained by a processor connected to a network and the display is controlled by a browser application operating on a user device connected to the processor via the network.

9. The method of claim 1, further comprising:

transmitting to a browser application operating on a user device a first request to display the first and second boundaries in the selected orientation; and transmitting to the browser a second request to scroll information in the first, second and third sets of cells in accordance with the alternating pattern.

10. A non-transitory computer readable medium having program instructions stored thereon, the instructions capable of execution by a processor and defining the steps of:

defining first, second, and third sets of spreadsheet cells in a display, the first and second sets being separated by a first boundary having a selected orientation, the second and third sets being separated by a second boundary having the selected orientation;

disabling a selected scrolling function within selected sets among the first, second and third sets of cells in accordance with an alternating pattern; and determining the alternating pattern based on a selection received from a user;

wherein the instructions defining the step of disabling a selected scrolling function within selected sets among the first, second and third sets of cells in accordance with an alternating pattern further comprise instructions defining the steps of:

disabling the selected scrolling function only within the first and third sets of cells, if the user selects the first set or the third set; and disabling the selected scrolling function only within the second sets of cells, if the user selects the second set.

11. The non-transitory computer readable medium of claim 10, wherein the selected scrolling function is selected from a vertical scrolling function and a horizontal scrolling function.

12. The non-transitory computer readable medium of claim 10, further comprising instructions defining the steps of:

receiving from the user a first selection of one of the first, second, and third sets of spreadsheet cells and a request for additional options;

displaying a menu comprising a disable scrolling option, in response to the request;

receiving from a user a second selection of the disable scrolling option; and disabling a scrolling function within selected sets of spreadsheet cells, in response to the second selection.

13. The non-transitory computer readable medium of claim 10, further comprising instructions defining the step of:

determining the first, second and third sets of spreadsheet cells based on input received from a user.

14. The non-transitory computer readable medium of claim 13, further comprising instructions defining the steps of:

adjusting a first position of the first boundary in response to first signals received from the user; and adjusting a second position of the second boundary in response to second signals received from the user.

15. The non-transitory computer readable medium of claim 14, wherein the first and second boundaries have an orientation selected from a vertical orientation and a horizontal orientation.

* * * * *